(12) United States Patent
Pasca et al.

(10) Patent No.: US 7,937,265 B1
(45) Date of Patent: May 3, 2011

(54) PARAPHRASE ACQUISITION

(75) Inventors: Alexandru Marius Pasca, Sunnyvale, CA (US); Peter Szabolcs Dienes, Mountain View, CA (US)

(73) Assignee: Google Inc., Mountain View, CA (US)

( * ) Notice: Subject to any disclaimer, the term of this patent is extended or adjusted under 35 U.S.C. 154(b) by 1204 days.

(21) Appl. No.: 11/238,623

(22) Filed: Sep. 27, 2005

(51) Int. Cl.
*G06F 17/27* (2006.01)

(52) U.S. Cl. ........... 704/9; 704/1; 704/10; 704/8; 704/7; 704/257

(58) Field of Classification Search ............... 704/9, 1, 704/257, 10, 8, 7
See application file for complete search history.

(56) References Cited

U.S. PATENT DOCUMENTS

| | | | |
|---|---|---|---|
| 5,469,355 A | 11/1995 | Tsuzuki | |
| 5,594,641 A | 1/1997 | Kaplan et al. | |
| 5,675,819 A | 10/1997 | Schuetze | |
| 5,870,706 A | 2/1999 | Alshawi | |
| 5,907,821 A | 5/1999 | Kaji et al. | |
| 5,926,811 A | 7/1999 | Miller et al. | |
| 6,026,388 A | 2/2000 | Liddy et al. | |
| 6,098,033 A * | 8/2000 | Richardson et al. | 704/1 |
| 6,321,191 B1 | 11/2001 | Kurahashi | |
| 6,453,315 B1 | 9/2002 | Weissman et al. | |
| 6,473,729 B1 | 10/2002 | Gastaldo et al. | |
| 6,519,585 B1 | 2/2003 | Kohli | |
| 6,560,608 B1 | 5/2003 | Tomm et al. | |
| 7,013,264 B2 * | 3/2006 | Dolan et al. | 704/9 |
| 7,136,876 B1 * | 11/2006 | Adar et al. | 707/104.1 |
| 7,412,385 B2 | 8/2008 | Brockett et al. | |
| 7,636,714 B1 | 12/2009 | Lamping et al. | |
| 2003/0004716 A1 | 1/2003 | Haigh et al. | |
| 2003/0105633 A1 | 6/2003 | Delaunay et al. | |
| 2003/0158850 A1 | 8/2003 | Lawrence et al. | |
| 2003/0200198 A1 | 10/2003 | Chandrasekar et al. | |
| 2003/0204400 A1 | 10/2003 | Marcu et al. | |
| 2003/0212666 A1 | 11/2003 | Basu et al. | |
| 2004/0006465 A1 * | 1/2004 | Phillips et al. | 704/240 |
| 2004/0044952 A1 * | 3/2004 | Jiang et al. | 715/500 |
| 2004/0059565 A1 | 3/2004 | Dehlinger et al. | |
| 2004/0064447 A1 | 4/2004 | Simske et al. | |
| 2004/0078190 A1 | 4/2004 | Fass et al. | |
| 2004/0199498 A1 | 10/2004 | Kapur et al. | |

(Continued)

OTHER PUBLICATIONS

Brants, "TnT—A Statistical Part-of-Speech Tagger", *Proceedings of the 6th Applied NLP Conference*, ANLP 2000, Seattle, WA, pp. 224-231.

(Continued)

*Primary Examiner* — Qi Han
(74) *Attorney, Agent, or Firm* — Fish & Richardson P.C.

(57) ABSTRACT

Methods and apparatus, including systems and computer program products, to acquire potential paraphrases from textual input. In one aspect, textual input is received, a first map is generated, where the key of the first map is an ngram identified in the textual input and the value associated with the key of the first map is a unique identifier, a second map is generated, where the key of the second map is an anchor identified from the ngram and the value associated with the key of the second map is one or more middle portions associated with the anchor, and a third map is generated, where the key of the third map is a potential paraphrase pair identified from the middle portions and the value associated with the key of the third map is the one or more unique anchors associated with the potential paraphrase pair.

24 Claims, 3 Drawing Sheets

U.S. PATENT DOCUMENTS

| | | | |
|---|---|---|---|
| 2005/0004799 A1 | 1/2005 | Lyudovyk |
| 2005/0027691 A1 | 2/2005 | Brin et al. |
| 2005/0065774 A1 | 3/2005 | Doganata et al. |
| 2005/0081139 A1 | 4/2005 | Witwer et al. |
| 2005/0125215 A1 | 6/2005 | Wu et al. |
| 2005/0149499 A1 | 7/2005 | Franz et al. |
| 2006/0009965 A1 | 1/2006 | Gao et al. |
| 2006/0015326 A1 | 1/2006 | Mori et al. |
| 2006/0101000 A1 | 5/2006 | Hacigumus et al. |
| 2006/0106595 A1 | 5/2006 | Brockett et al. |
| 2006/0111896 A1 | 5/2006 | Menezes |
| 2006/0218136 A1 | 9/2006 | Surakka et al. |
| 2007/0038659 A1 | 2/2007 | Datar et al. |
| 2007/0083359 A1 | 4/2007 | Bender |

OTHER PUBLICATIONS

Pasca and Dienes, "Aligning Needles in a Haystack: Paraphrase Acquisition Across the Web" *IJCNLP* 2005: pp. 119-130.

Daniel Worlton, A Computational Approach to Paraphrase Recognition, Apr. 22, 2005, pp. 1-57.

R. Bunescu and M. Pasca. 2006. "Using Encyclopedic Knowledge for Named Entity Disambiguation." In *Proceedings of the 11th Conference of the European Chapter of the Association for Computational Linguistics (EACL-06)*, Trento, Italy.

Y. Chiaramella, P. Mulhern, M. Mechkour, I. Ounis, M. Pasca. 1998. "Towards a Fast Precision-Oriented Image Retrieval System." In *Proceedings of the 21st Annual International ACM SIGIR Conference on Research and Development in Information Retrieval*, Aug. 24-28 1998, Melbourne, Australia. SIGR '98.

S. Harabagiu, D. Moldovan, M. Pasca, M. Surdeanu, R. Mihalcea, R. Girju, V. Rus, F. Lacatusu, P. Morarescu and R. Bunescu. 2001. "Answering complex, list and context questions with LCC's Question-Answering Server." In *Proceedings of the Tenth Text Retrieval Conference (TREC-10)*, Gaithersburg, Maryland, Nov. 13-16, 2001.

S. Harabagiu, M. Pasca and V. Lacatusu. 2001. "Dialogue Management for Interactive Question Answering." In *Proceedings of the Fourteenth International Florida Artificial Intelligence Research Society Conference*, Key West, Florida.

Document S. Harabagiu, M. Pasca and S. Maiorano. 2000. "Experiments with Open-Domain Textual Question Answering." In Proceedings of the COLING-2000, Association for Computational Linguistics/Morgan Kaufmann, Aug. 2000. Saarbruken, Germany.

S. Harabagiu, D. Moldovan, M. Pasca, R. Mihalcea, M. Surdeanu, R. Bunescu, R. Girju, V. Rus, and P. Morarescu. 2000. "FALCON: Boosting Knowledge for Answer Engines." In the *Proceedings of Text Retrieval Conference (TREC-9)*, 2000. Gaithersburg, Maryland.

S. Harabagiu and M. Pasca. 1999. "Integrating Symbolic and Statistical Methods for Prepositional Phrase Attachment." In Proceedings of the Twelfth International Florida AI Research Society Conference. Orlando, Florida May 3-5, 1999. AAAI Press. National Language Processing.

S. Harabagiu, M. Pasca and S. Maiorano. 2001. "A Knowledge-Based Answer Engine for Open-Domain Questions." *International Journal on Artificial Intelligence Tools*, vol. 10, Nos. 1&2, 199-224. World Scientific Publishing Company.

S. Harabagiu and M. Pasca. 2000. "Mining Textual Answers with Knowledge-Based Indicators." In *Proceedings of FLAIRS-2000*, May 2000, Orlando FL, pp. 214-218.

S. Harabagiu, S. Maiorano, and M. Pasca. 2003. "Open-Domain Textual Question Answering Techniques." *Natural Language Engineering 9* (3): 231-267. Cambridge University Press.

S. Harabagiu, D. Moldovan, M. Pasca, R. Mihalcea, M. Surdeanu, R. Bunescu, R. Girju, V. Rus, and P. Morarescu. 2001. "The Role of Lexico-Semantic Feedback in Open-Domain Textual Question-Answering." In *Proceedings of the 39th Annual Meeting on Association for Computational Linguistics*, Toulouse, France. pp. 282-289.

D. Moldovan, M. Pasca, S. Harabagiu and M. Surdeanu. 2003. "Performance Issues and Error Analysis in an Open-Domain Question Answering System." *ACM Transactions on Information Systems*, vol. 21, No. 2, Apr. 2003, pp. 133-154.

D. Moldovan, S. Harabagiu, M. Pasca, R. Mihalcea, R. Girju, R. Goodrum and V. Rus. 2000. "The Structure and Performance of an Open-Domain Question Answering System." In *Proceedings of the Conference of the Association for Computational Linguistics (ACL-2000)*, 563-570. Available online at: http://citeseer.ist.psu.edu/moldovan00structure.html.

I. Ounis and M. Pasca. 1997 IEEE. "An Extended Inverted File Approach for Information Retrieval." In *Proceedings of the 1997 International Symposium on Database Engineering & Applications*. pp. 397-402.

I. Ounis and M. Pasca. 1998. "Modeling, Indexing and Retrieving Images Using Conceptual Graphs." In *Proceedings of the 9th International Conference on Database and Expert Systems Applications*. Springer-Verlag, London, UK. pp. 226-239.

I. Ounis and M. Pasca. 1998. "A Promising Retrieval Algorithm for Systems based on the Conceptual Graphs Formalism." In *Proceedings of the 1998 International Symposium on Database Engineering & Applications*. IDEAS 1998.

I. Ounis and M. Pasca. 1999 IEEE. "The Relief Retrieval System." In *Proceedings of 1997 IEEE Knowledge and Data Engineering Exchange Workshop*. Grenoble Cedex France.

I. Ounis and M. Pasca. 1998. "Relief: Combining expressiveness and rapidity into a single system." In *Proceedings of the 21st Annual International ACM SIGIR Conference on Research and Development in Information Retrieval*, Aug. 24-28, 1998, Melbourne, Australia. SIGIR '98, pp. 266-274.

M. Pasca. CIKM 2004. "Acquisition of Categorized Named Entities for Web Search." In *Proceedings of the thirteenth ACM international conference on Information and knowledge management*. Washington, D.C. pp. 137-145.

M. Pasca. 2002. "Answer Finding Guided by Question Semantic Constraints." In *Proceedings of The Fifteenth International Florida Artificial Intelligence Research Society Conference*, May 14-16, 2002. Pensacola Beach, Florida.

M. Pasca. CICLing 2005. "Finding Instance Names and Alternative Glosses on the Web: WordNet Reloaded." *A. Gelbukh (Ed.): CICLing 2005, LNCS 3406*, pp. 280-292. Springer-Verlag Berlin Heidelberg.

M. Pasca and S. Harabagiu. SIGIR 2001. "High Performance Question/Answering." In *Proceedings of the 24th annual international Acm Sigir conference on Research and development in information retrieval table of contents*, New Orleans, Louisiana. pp. 366-374.

M. Pasca. 2005. "Mining Paraphrases from Self-anchored Web Sentence Fragments." *A. Jorge et al. (Eds.): PKDD 2005, LNAI 3721*, pp. 193-204. Springer-Verlag Berlin Heidelberg.

M. Pasca, D. Lin, J. Bigham, A. Lifchits and A. Jain. 2006. "Names and Similarities on the Web: Fact Extraction in the Fast Lane." In *Proceedings of the 21st International Conference on Computational Linguistics and 44th Annual Meeting of ACL*, Sydney, Jul. 2006. pp. 809-816.

M. Pasca, D. Lin, J. Bigham, A. Lifchits, and A. Jain. 2006. "Organizing and Searching the World Wide Web of Facts—Step One: The One-Million Fact Extraction Challenge." In *Proceedings of the 21st National Conference on Artificial Intelligence (AAAI-06)*, pp. 1400-1405, Boston, Massachusetts.

M. Pasca. 2002. "Processing Definition Questions in an Open-Domain Question Answering System." *Supplied by the British Library—"The world's knowledge."* AAAI-2002.

M. Pasca. 2003. "Question-Driven Semantic Filters For Answer Retrieval." International Journal of Pattern Recognition and Artificial Intelligence. vol. 17, No. 5 (2003) 741-756. World Scientific Publishing Company.

M. Pasca. 2001. "Unveiling Next Generation Search Technologies: Answer Extraction on the Web." 2nd International Conference on Internet Computing (IC-2001), Jun. 2001, Las Vegas, Nevada.

M. Pasca and B. Van Durme. 2007. "What You Seek Is What You Get: Extraction of Class Attributes from Query Logs." In *Proceedings of the 20th International Joint Conference on Artificial Intelligence (IJCAI-07)*, pp. 2832-2837, Hyderabad, India.

M. Pignataro, M. Pasca, and P. Franchin. 2000. "Post-buckling analysis of corrugated panels in the presence of multiple interacting modes." Thin Walled Structures, Elsevier Science Ltd., vol. 36, pp. 47-66.

D. Yarowsky, "Word-Sense Disambiguation Using Statistical Models of Roget's Categories Trained on Large Corpora," AT&T Bell Laboratories, In Proceedings, Coling-1992, pp. 1-11.

W. Gale et al., "A Program for Aligning Sentences in Bilingual Corpora," Computational Linguistics, 1994, pp. 1-30.

P. Brown et al., "The Mathematics of Statistical Machine Translation: Parameter Estimation", Association for Computation Linguistics, vol. 19, No. 2, Jun. 1993, pp. 263-311.

C. Quirk et al., "Monolingual Machine Translation for Paraphrase Generation," Natural Language Processing Group, Processing of the 2004 Conf. On Empirical Methods . . . , 2004, pp. 1-8.

R. Barzilay et al., "Extracting Paraphrases from a Parallel Corpus," Computer Science Dept., Annual Mtg. Assoc. For Computational Linguistics, 2001, pp. 1-8.

R. Barzilay et al., "Learning to Paraphrase: An Unsupervised Approach Using Multiple-Sequence Alignment," Proceedings of HLT-HAACL 2003, Main Papers, Edmonton, May-Jun. 2003, pp. 16-23.

E. Brill et al., "Automatically Harvesting Katakana-English Term Pairs from Search Engine Query Logs," Microsoft Research, In Proceedings of the Sixth Language Processing Pacific Rim Symposium, NLPRS, 2001, pp. 393-399.

D. Lin et al., "DIRT—Discovery of Inference Rules from Text," University of Alberta, Department of Computing Science, In Proceedings of the ACM SIGKDD Conf. on Knowledge Disc. And Data Mining, 2001, www.cs.ualberta.ca/.about.lindek/minipar.htm, 2001, pp. 323-328.

B. Pang et al., "Syntax-based Alignment of Multiple Translations: Extracting Paraphrases and Generating New Sentences," HLT-NAACL Main Proceedings, 2003, pp. 181-188.

A. Ibrahim, "Extracting Paraphrases from Aligned Corpora," Massachusetts Institute of Technology Dept. of Electrical Eng. And Computer Science, Submitted to the Department of Electrical Engineering and Computer Science on Aug. 23, 2002, pp. 2-60.

C. Quirk et al., "Dependency Treelet Translation: Syntactically Informed Phrasal SMT," Proceedings of the 43rd Annual Meeting of the ACL, Association for Computer Linguistics, Ann Arbor, Jun. 2005, pp. 271-279.

E. K. Ringger et al., "A Fertility Channel Model for Post-Correction of Continuous Speech Recognition," Proceedings of the 4th International Conference on Spoken Language Processing (ICSIP'96), Philadelphia, PA. Oct. 1996, pp. 1-4.

B.J. Kang et al., "Automatic Transliteration and Back-Transliteration by Decision Tree Learning," Department of Computer Science, Proceedings of 2nd International Conference on Language Resources and Evaluation, Athens, Greece May-Jun. 2000, pp. 1135-1141.

Y. Shinyama et al., "Automatic Paraphrase Acquisition from News Articles," Department of Computer Science, NY University, Proceedings of Human Language Technology Conference 2002, pp. 40-46.

K.S. Jeong et al., "Automatic Identification and Back-Transliteration of Foreign Words for Information Retrieval," Information Processing and Management: An International Journal, Oxford, NY, Pergamon Press. 1999, pp. 523-540.

B. Dolan et al., "Unsupervised Construction of Large Paraphrase Corpora: Exploiting Massively Parallel News Source," Natural Language Processing Group, Microsoft Research, Proceedings of CoLING 2004, Geneva Switzerland, pp. 1-7.

B. G. Stalls et al., "Translating Names and Technical Terms in Arabic Text," Proceedings of the COLING/ACL Workshop on Computational Linguistics, 1998, pp. 1-8.

K. Knight et al., "Machine Transliteration," Information Sciences Institute, Proceedings of the 35th Annual Meeting of the Association for Computational Linguistics, 1997, pp. 128-135.

Y.Y. Wang et al., "Decoding Algorithm in Statistical Machine Translation," Proceedings of 35th Annual Meeting of the Association of Computational Linguistics, 1997, pp. 1-7.

Y. Al-Onaizan et al., "Machine Transliteration of Names in Arabic Text," Proceedings of ACL Workshop on Computational Approaches to Semitic Languages, 2002, pp. 1-14.

B.J. Kang et al., "English-Korean Automatic Transliteration/Back-transliteration System and Character Alignment," Department of Computer Science, The 38th Annual Meeting of the Association for Computational Linguistics, Oct. 1-8, 2000, pp. 1-2.

Y. Al-Onaizan et al., "Translating Named Entities Using Monolingual and Bilingual Resources," Information Sciences Institute, Proceedings of the 40th Annual Meeting of the Association for Computational Linguistics (ACL), Philadelphia, PA, Jul. 2002, pp. 400-408.

P. Virga et al., "Transliteration of Proper Names in Cross-Lingual Information Retrieval," John Hopkins University, Proceedings of the ACL Workshop on Multi-lingual Named Entity Recognition 2003, pp. 1-8.

J. Col. Zoom inventors and inventions. Enchanted Learning. 2004. www.enchantedlearning.com.

C. Fellbaum, editor. WordNet: An Electrical Lexical Database and Some of its Applications. MIT Press, 1998.

Schülze and Pedersen, "Information Retrieval Based on Word Senses, " Proceedings of the $4^{th}$ Annual Smyposium on Document Analysis and Information Retrieval, 1995, pp. 161-175, Xerox Paolo Alto Research Center, CA, USA.

Chinchor and Marsh, "MUC-7 Information Extraction Task Definition Version 5.1" Proceedings of the $7^{th}$ Message Understanding Conference, 1998.

Barzilay and Lee, "Learning to Paraphrase: An Unsupervised Approach Using Multiple-Sequence Alignment," Proceedings of the 2003 Human Language Technology Conference (HLT-NAACL-03), 2003, pp. 16-23, Edmonton, Canada.

Barzilay and McKeown, "Extracting Paraphrases from a Parallel Corpus," Proceedings of the $39^{th}$ Annual Meeting of the Association for Computational Linguistics (ALC-01), 2001, pp. 50-57, Toulouse, France.

Chieu and Lee, "Query Based Event Extraction Along Timeline, " Proceedings of the $27^{th}$ ACM Conference on Research and Development in Information Retrieval, DSO National Laboratories, Sheffield, United Kingdon. 2004.

Collins, "Head-Driven Statistical Models for Natural Language Parsing, " PhD thesis, University of Pennsylvania, Philadelphia, 1999.

Dolan, Quirk, and Brockett, "Unsupervised Construction of Large Paraphrase Corpora: Exploiting Massively Parallel News Sources," Proceedings of the $20^{th}$ International Conference on Computational Linguistics, 2004, pp. 350-356, Geneva Switzerland.

Filatova and Hovy, "Assigning Time-Stamps to Event-Clauses," Proceedings of the $39^{th}$ Annual Meeting of the ACL, 2001, pp. 88-95, Toulouse, France.

Gonzalo, Verdejo, Chugur, and Cigarran, " Indexing with WordNet synsets can improve text retrieval," Proceedings of the $17^{th}$ International Conference on Computational Linguistics and 36th Annual Meeting of the Association for Computational Linguistics, Workshop on Usage of WordNet in Natural Language Processing Systems. 1998.

Hearst, "Automatic Acquisition of Hyponyms from Large Text Corpora," Proceedings of the $14^{th}$ International Conference on Computational Linguistics, 1992, pp. 539-545, Nantes France.

Jacquemin, Klavans, and Tzoukermann, "Expansion of Multi-Word Terms for Indexing and Retrieval Using Morphology and Syntax," Proceedings of the $35^{th}$ Annual Meeting of the Association for Computational Linguistics, 2000, pp. 24-31, Madrid Spain.

Mani and Wilson, "Robust Temporal Processing of News," Proceedings of the $38^{th}$ Annual Meeting of the Association of Computational Linguistics. 2000, pp. 69-70, Hong Kong.

Mitra, Singhal, and Buckley, Improving Automatic Query Expansion, Proceedings of the $21^{st}$ ACM Conference on Research and Development in Information Retrieval, 1998, pp. 206-214, Melbourne Australia.

Phillips and Riloff, "Exploiting Strong Syntactic Heuristics and Co-Training to Learn Semantic Lexicons." Proceedings of the Conference on Empirical Methods in Natural Language Processing, 2002. pages 125-132, Philadelphia, Pennsylvania.

Pustejovsky, Gaizauskas, and Katz, "TimeML: Robust Specification of Event and Temporal Expressions in Text," Proceedings of the 5th International Workshop on Computational Semantics, 2003, Tilburg Netherlands.

Ravichandran and Hovy, "Learning Surface Text Patterns for a Question Answering System," Proceedings of the $40^{th}$ Annual Meetings of the Association of Computational Linguistics, 2002, Pennsylvania.

M. Remy, Wikipedia: The Free Encyclopedia Online, Information Review, 26 (6); 434, 2002.

Schiffman, Mani, and Concepcion, "Producing Biographical Summaries; Combining Linguistic Knowledge with Corpus Statistics,"

Proceedings of the 39$^{th}$ Annual Meeting of the Association for Computational Linguistics, 2001, pp. 450-457, Toulouse France.

Shinyama, Sekine, and Sudo, "Automatic Paraphrase Acquisition from News Articles" Proceedings of the Human Language Technology Conferences, 2002, pp. 40-46, San Diego, California.

Zukerman and Raskutti, "Lexical Query Paraphrasing for Document Retrieval," Proceedings of the 19$^{th}$ International Conference on Computational Linguistics, 2002, pp. 1177-1183, Taipei, Taiwan.

Allan, Khandelwal and Gupta, "Temporal Summaries of News Topics," Proceedings of the 24th ACM Conference on Research and Development in Information Retrieval (SIGIR-01), pp. 10-18, New Orleans, Louisiana, 2001.

Gildea and Jurafsky, "Automatic Labeling of Semantic Roles," Proceedings of the 38$^{th}$ Annual Meeting of the Association of Computational Linguistics (ACL-00), pp. 512-520, Hong Kong, 2000.

USPTO Non-Final Office Action in U.S. Appl. No. 11/087,446, mailed Aug. 22, 2007, 11 pages.

USPTO Final Office Action in U.S. Appl. No. 11/087,446, mailed Feb. 5, 2008, 13 pages.

USPTO Advisory Action in U.S. Appl. No. 11/087,446, mailed Apr. 25, 2008, 3 pages.

USPTO Non-Final Office Action in U.S. Appl. No. 11/087,446, mailed Apr. 3, 2009, 36 pages.

USPTO Final Office Action in U.S. Appl. No. 11/087,446, mailed Nov. 5, 2009, 40 pages.

USPTO Advisory Action in U.S. Appl. No. 11/087,446, mailed Feb. 19, 2010, 5 pages.

* cited by examiner

PARAPHRASE ACQUISITION

BACKGROUND

This invention relates to the acquisition of paraphrases from text by automatic data processing systems.

Information captured in text, e.g., text stored in documents, can encode semantically equivalent ideas through different lexicalizations. Indeed, given the generative power of natural language, different people typically employ different words or phrases to convey the same meaning, depending on factors such as background knowledge, level of expertise, style, verbosity and personal preferences. Two semantically equivalent fragments of text may differ only slightly, as a word or a phrase in one of them is paraphrased in the other, e.g., through a synonym. Yet even small lexical variations represent challenges to any automatic process attempting to decide whether two text fragments have the same meaning, or are relevant to each other, since they are no longer lexically identical. Many natural-language intensive computer program applications include modules that make such decisions. In document summarization, the generated summaries have a higher quality if redundant information has been discarded by detecting text fragments with the same meaning. In information extraction, extraction templates will not be filled consistently whenever there is a mismatch in the trigger word or the applicable extraction pattern. Similarly, a question answering system could incorrectly discard a relevant document passage based on the absence of a question phrase deemed as very important, even if the passage actually contains a legitimate paraphrase.

Identifying different words or phrases with the same meaning can be useful in various contexts, such as identifying alternative query terms for a specific user query. Deciding whether a text fragment (e.g., a document) is relevant to another text fragment (i.e., the query) is generally crucial to the overall output, rather than merely useful within some internal system module. Indeed, relevant documents or passages may be missed, due to an apparent mismatch between their terms and the paraphrases occurring in the users' queries. The previously proposed solutions to the mismatch problem vary with respect to the source of the data used for enriching the query with alternative term.

SUMMARY

In particular implementations, the present invention provides methods and apparatus, including computer program products, implementing techniques for acquiring potential paraphrases from textual input.

In one aspect, textual input is received, a plurality of ngrams are identified, where each ngram is a sequence of words within the textual input, each identified ngram is divided into three portions: a beginning constant portion containing a first number of words at the beginning of the ngram, an ending constant portion containing a second number of words at the end of the ngram, and a middle portion containing the words of the ngram between the beginning constant portion and the ending constant portion, and an anchor for each ngram is determined, the anchor including the beginning constant portion and the ending constant portion of the ngram. If the anchor of a first ngram is the same as the anchor of a second ngram, the middle portion of the first ngram and the middle portion of the second ngram are identified as a potential paraphrase pair.

Advantageous implementations can include one or more of the following features. A named entity may be included as part of the anchor. A remainder of an adverbial relative clause modifying the named entity may be included as part of the anchor. All ngrams in all identified sentences may be identified, including overlapping ngrams. All potential paraphrase pairs may be identified. The number of unique anchors associated with each identified potential paraphrase pair may be counted to determine the quality of each potential paraphrase pair, where potential paraphrase pairs that are associated with a larger number of anchors are of higher quality than potential paraphrase pairs that are associated with a smaller number of anchors. The potential paraphrase pair may be a paraphrase pair if the number of unique anchors associated with the potential paraphrase pair is equal to or greater than a threshold value. A term may be received, the term comprised of a sequence of one or more words, one or more paraphrase pairs may be identified where the term is identical to a paraphrase member, where the middle portion of the first ngram is a first paraphrase member and the middle portion of the second ngram is a second paraphrase member, and the non-identical paraphrase member of each identified paraphrase pair may be added to a set of suggested alternatives for the term. Each ngram may have between seven and ten words. The first constant number of words may be three words, and the second constant number of words may be three words.

In other aspect, textual input is received, a first map is generated, where the key of the first map is an ngram identified in the textual input and the value associated with the key of the first map is a unique identifier, a second map is generated from the contents of the first map, where the key of the second map is an anchor identified from the ngram and the value associated with the key of the second map is one or more middle portions associated with the anchor, and a third map is generated from the contents of the second map, where the key of the third map is a potential paraphrase pair identified from the middle portions and the value associated with the key of the third map is the one or more unique anchors associated with the potential paraphrase pair.

Advantageous implementations can include one or more of the following features. The first map, second map, and third map may be generated using a distributed architecture of multiple computers. The distributed architecture of multiple computers may implement a map reduce infrastructure. The value of one or more anchors associated with the potential paraphrase pair key of the third map may be used to determine a quality of the potential paraphrase pair, where the potential paraphrase pair that has a larger number of unique anchors is of higher quality than the potential paraphrase pair that has a smaller number of unique anchors.

The invention can be implemented to realize one or more of the following advantages. Large sets of word- and phrase-level paraphrases are acquired by exhaustive pairwise alignment of sentence fragments across a large set of document sentences. Paraphrases are acquired from this pairwise alignment. The paraphrases are not limited to variations of specialized, domain-specific terms, nor are the paraphrases restricted to a narrow class such as verb paraphrases. High-quality, clean, trustworthy, or properly-formatted input data is not required; the input data can include inherently noisy, unreliable World Wide Web (Web) documents. The acquisition of paraphrases does not rely on external clues and attributes that two particular documents are parallel or that they report on the same or very similar events. The acquisition of paraphrases does not rely on tools that require a syntactic parser to provide a syntactic or dependency structure for the sentences. One implementation of the invention provides all of the above advantages.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numerals in the various drawings indicate like elements.

DETAILED DESCRIPTION

Figure 1:
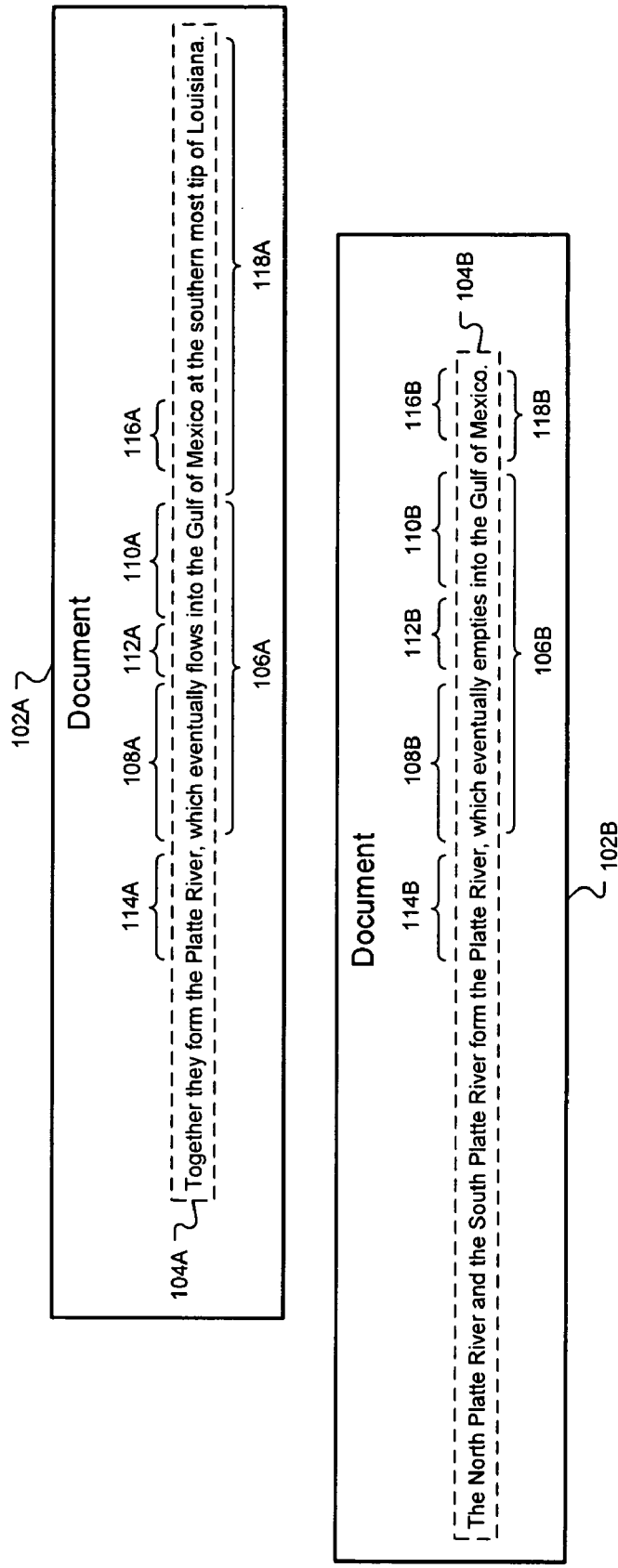
FIG. 1 is a block diagram of two documents including sentences containing similar ngrams.

FIG. 1 illustrates a set of documents 100 that contains a first document 102A and a second document 102B, each with a sentence containing common word sequences. The set of documents 100 may include a large number of documents. For example, the set of documents 100 can include the approximately one billion documents contained in an archive of the Web.

The document 102A contains a sentence 104A and the document 102B contains a sentence 104B. A document can contain more than one sentence and a sentence can contain more than one word ngram. In this specification, a "word ngram" or "ngram" is defined to be a subsequence of words from a given string (i.e., sequence) of words. For example, all possible ngrams that can be generated from the string of words "he ran fast" are "he", "ran", "fast", "he ran", "ran fast" and "he ran fast". In general, each ngram is a sentence fragment; however, it is possible for the ngram to be an entire sentence. In some implementations, all punctuation marks are ignored when generating ngrams.

Optionally, in identifying sentences, sentences in the documents can be filtered to exclude from the group sentences that are too complex or too simple to process. For example, sentences containing fewer than 5 words or more than 30 words can be excluded.

Other restrictions may be placed on the sentences; for example, all words in a sentence must contain fewer than 30 letters; a sentence must contain at least one verb that is neither a gerund nor a modal verb; a sentence must contain at least one word that is not a verb and is not capitalized; or fewer than half of the words in a sentence may be numbers. The first sentence 104A contains a first ngram that is potentially similar to a second ngram contained in the second sentence 104B, in the sense that there is a beginning constant portion of the first ngram which is potentially identical to a beginning constant portion of the second ngram, and an ending constant portion of the first ngram which is potentially identical to an ending constant portion of the second ngram. The beginning constant portions and ending constant portions are 'constant' because the number of words in each of the beginning constant portions is the same, and the number of words in each of the ending constant portions is the same.

Together, a beginning constant portion and an ending constant portion of a single ngram form what will be referred to as an anchor. If the anchors of two ngrams are identical, the middle portions between the beginning constant portions and the ending constant portions are considered to be a potential paraphrase pair. For example, in the set of documents 100, the beginning constant portion 108A in the ngram 106A is identical to a beginning constant portion 108B in the ngram 106B, and the ending constant portion 110A in the ngram 106A is identical to an ending constant portion 110B in the ngram 106B. Therefore, the middle portions 112A and 112B are a potential paraphrase pair.

Figure 2:
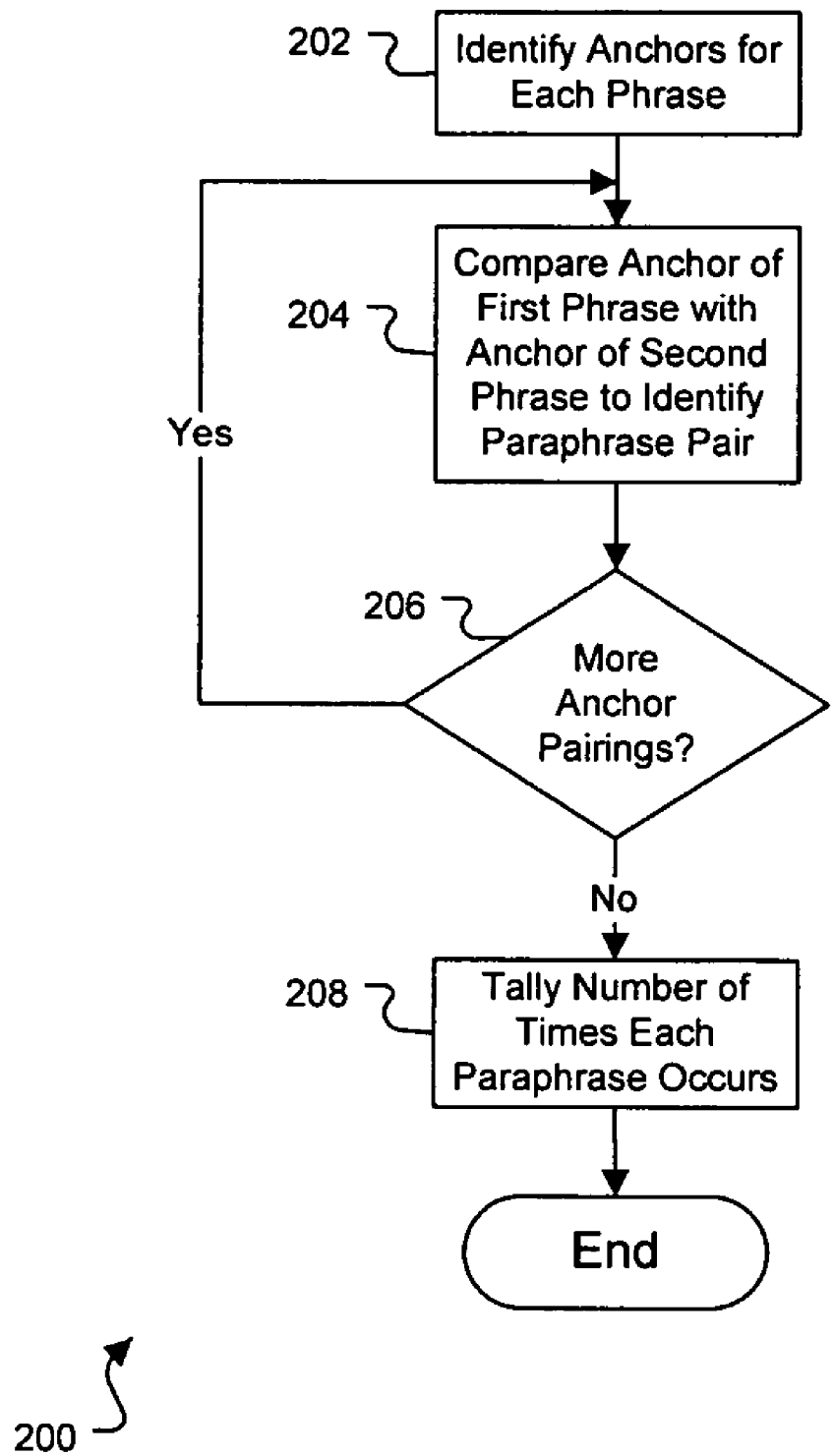
FIG. 2 is a flow chart illustrating a method to determine whether two or more ngrams contain a paraphrase pair.

FIG. 2 is a flow chart illustrating a method 200 for identifying ngrams within a body of text and for identifying potential paraphrase pairs using the identified ngrams. Although the method 200 is impractical for identifying potential paraphrase pairs within an extremely large body of text, this method is being described for its illustrative value. The textual input can be contained in one or more documents. The documents can contain information on any topic. Some or all of the documents can be poorly or inconsistently formatted, such as a set of documents from the Web.

Ngrams within the body of text and the anchors for each ngram are identified (step 202). In one implementation, all possible ngrams between seven and ten words in length in the set of documents 100 are evaluated, where the beginning and ending constant portions of the ngrams are each three words in length and a middle portion in between the beginning and ending constant portions is therefore between one and four words in length. In alternative implementations, the ngrams can be shorter than seven words in length or longer than ten words in length. In an additional implementation, the beginning constant portions of the ngrams are a first fixed number of words in length, the first fixed number being any integer greater than zero, and the ending constant portion of the ngrams are a second fixed number of words in length, the second fixed number being any integer greater than zero. The first fixed number of words need not be the same as the second fixed number of words. In one implementation, document metadata, such as Hypertext Markup Language (HTML) tags, are not included in the text from which ngrams are identified.

The anchor of a first ngram is compared to the anchor of a second ngram to determine if the word sequences between the anchors form a potential paraphrase pair (step 204). The first ngram 106A contains a middle portion 112A and the second ngram 106B contains a middle portion 112B. If the anchors of two ngrams are the same, the middle portions of the two ngrams form a potential paraphrase pair, and each middle portion is a paraphrase member of the potential paraphrase pair. Potential paraphrase pairs can contain synonymous paraphrase members or can contain other information, such as alternatives for commonly misspelled words or misused phrases. Each anchor pairing is compared; if the anchor pairings match, the word sequences between the anchors form a potential paraphrase pair as described above. This comparison continues until every anchor pairing has been considered (step 206). A first anchor in an ngram used in a comparison may include or overlap with a second anchor in the same ngram used in another comparison.

To reduce the number of potential paraphrase pairs that include unrelated paraphrase members, additional information for comparison can be included with the anchor of a ngram. Thus, in an alternative implementation, an anchor of a ngram can contain a beginning constant portion, an ending constant portion, and additional information.

In one implementation, a named entity (e.g., person, location, title, etc.) preceding a beginning constant portion and a named entity following an ending constant portion of an ngram are added to the anchor. If no named entity precedes the beginning constant portion or follows an ending constant portion, the ngram is discarded. In one implementation, in order to ensure robustness on Web documents, simple heuristics are applied to identify named entities. For example, any proper noun can be considered to be a named entity, and proper nouns can be identified by part-of-speech tags. Part-of-speech tags specify for each word its part-of-speech as well as some other additional information (e.g., proper nouns, singular vs. plural, etc.). A part-of-speech tagger can be used to determine the part-of-speech tags applied to each word; a suitable part-of-speech tagger is described in T. Brants, TnT—a Statistical Part-of-Speech Tagger, *Proceedings of the 6th Applied NLP Conference*, pp. 224-231 (2000).

In an implementation that makes use of named entities, in the first ngram 106A a named entity 114A preceding the beginning constant portion 108A is added to the anchor of the ngram 106A. In the second ngram 106B a named entity 114B preceding the beginning constant portion 108B is added to the anchor of the ngram 106B. In addition, a named entity 116A following the ending constant portion 110A is added to the anchor of the ngram 106A; and a named entity 116B following the ending constant portion 110B is added to the anchor of the ngram 106B. If the anchor of the first ngram 106A continues to match the anchor of the second ngram 106B after the addition of the named entities, the middle portions are considered a potential paraphrase pair.

In another implementation, to improve accuracy of the identified potential paraphrase pairs, the anchor of an ngram is only considered if the ngram is adjacent to an adverbial relative clause modifying a named entity or a date. In this case, the anchor includes a remainder of an adverbial relative clause following the ending constant portion of the ngram (the named entity forming the initial portion of the adverbial relative clause). To ensure robustness on Web documents, simple heuristics rather than complex tools can be used to identify the additional information added to the anchor. Adverbial relative clauses, together with the entities or dates they modify, can be detected according to a small set of lexico-syntactic patterns which can be summarized as <[Date|Entity] [,|-|(|nil] [Wh] RelClause [,|-|)|.]>, where Wh is one of "who", "when", "which", or "where". The patterns are based mainly on wh-words and punctuation. The matching adverbial clause RelClause must satisfy a few other constraints, which aim at avoiding, rather than solving, complex linguistic phenomena. First, personal and possessive pronouns are often references to other entities. Therefore, clauses containing such pronouns are discarded as ambiguous. Second, appositives and other similar pieces of information are confusing when detecting the end of the current clause. Consequently, during pattern matching, if the current clause does not contain a verb, the clause is either extended to the right, or discarded upon reaching the end of the sentence. In general, the addition of the remaining adverbial relative clause is a stricter requirement than the addition of named entities alone.

In an implementation that makes use of named entities and adverbial relative clauses, in the first sentence 104A the named entity 114A is modified by the ngram 106A. In the second sentence 104B the named entity 114B is modified by the ngram 106B. The named entities are added to the anchors of their respective ngrams. A remainder 118A of the adverbial relative clause modifying the named entity 114A is also added to the anchor of the ngram 106A. A remainder 118B of the adverbial relative clause modifying the named entity 114B is added to the anchor of the ngram 106B. In this implementation, the middle portion 112A and the middle portion 112B are not a potential paraphrase pair, because the adverbial relative clause remainder 118A does not match the adverbial relative clause remainder 118B.

For example, the sentence "Together they form the Platte River, which eventually flows into the Gulf of Mexico at the southern most tip of Louisiana" has three named elements: "Platte River", "Mexico", and "Louisiana". One of the ngrams that can be extracted from this sentence is "River which eventually flows into the Gulf". If the beginning constant portion is three words long and the ending constant portion is three words long, the anchor for this ngram, without considering any of the named entities, is "River which eventually into the Gulf"; "River which eventually" is the beginning constant portion and "into the Gulf" is the ending constant portion. If the named entity following the ending constant portion is added to the anchor of this ngram, the anchor for this ngram is "River which eventually into the Gulf of Mexico". If the remainder of an adverbial relative clause modifying the named entity is also added to the anchor of this ngram, the anchor is "River which eventually into the Gulf of Mexico at the southern most tip of Louisiana", as the adverbial relative clause modifying the named entity is "at the southern most tip of Louisiana".

The implementations above allow an accurate set of potential paraphrase pairs to be identified from a set of poorly formatted documents 100. The documents 100 are not restricted to a particular genre, such as parallel news articles; and information external to the documents 100 is not required to validate the paraphrases. The filtering of ngrams and anchors is kept simple and does not include complex syntactic parsing, so that the set of documents 100 may be large without prohibitively increasing the amount of time needed to process the documents 100.

The number of times each potential paraphrase pair occurs is tallied (step 208). The number of times with which a given potential paraphrase pair occurs within the set of documents 100 can be an indication of the quality of the potential paraphrase pair. Each potential paraphrase pair can be ranked according to its frequency. The potential paraphrase pairs and their rankings can be stored for later use. A higher frequency can indicate a higher quality paraphrase pair and a lower frequency can indicate a lower quality paraphrase pair. For example, if a potential paraphrase pair "ripped/torn" is found eighty times within the set of documents 100, it is a higher quality paraphrase pair than a potential paraphrase pair "lost/won" that only appears six times within the set of documents 100.

In one implementation, the stored potential paraphrase pairs that exceed a minimum threshold quality level are considered higher quality paraphrase pairs and are provided to a user as suggestions for replacement in a phrase provided by the user. For example, the user can submit a search phrase to a Web search engine. The search engine can provide the user with suggestions for additional terms or phrases based upon the user's original search terms. Any term or phrase in the search term that is part of a higher quality paraphrase pair has an associated paraphrase member that can be provided to the user as a suggestion. The search engine may also order the suggestions based on the ranking of the higher quality paraphrase pairs contained in them. Alternatively, the search engine may automatically expand the search using the original search phrase and any other phrases generated by substituting one paraphrase member for the other paraphrase member of the higher quality paraphrase pair in the original search phrase.

Figure 3:
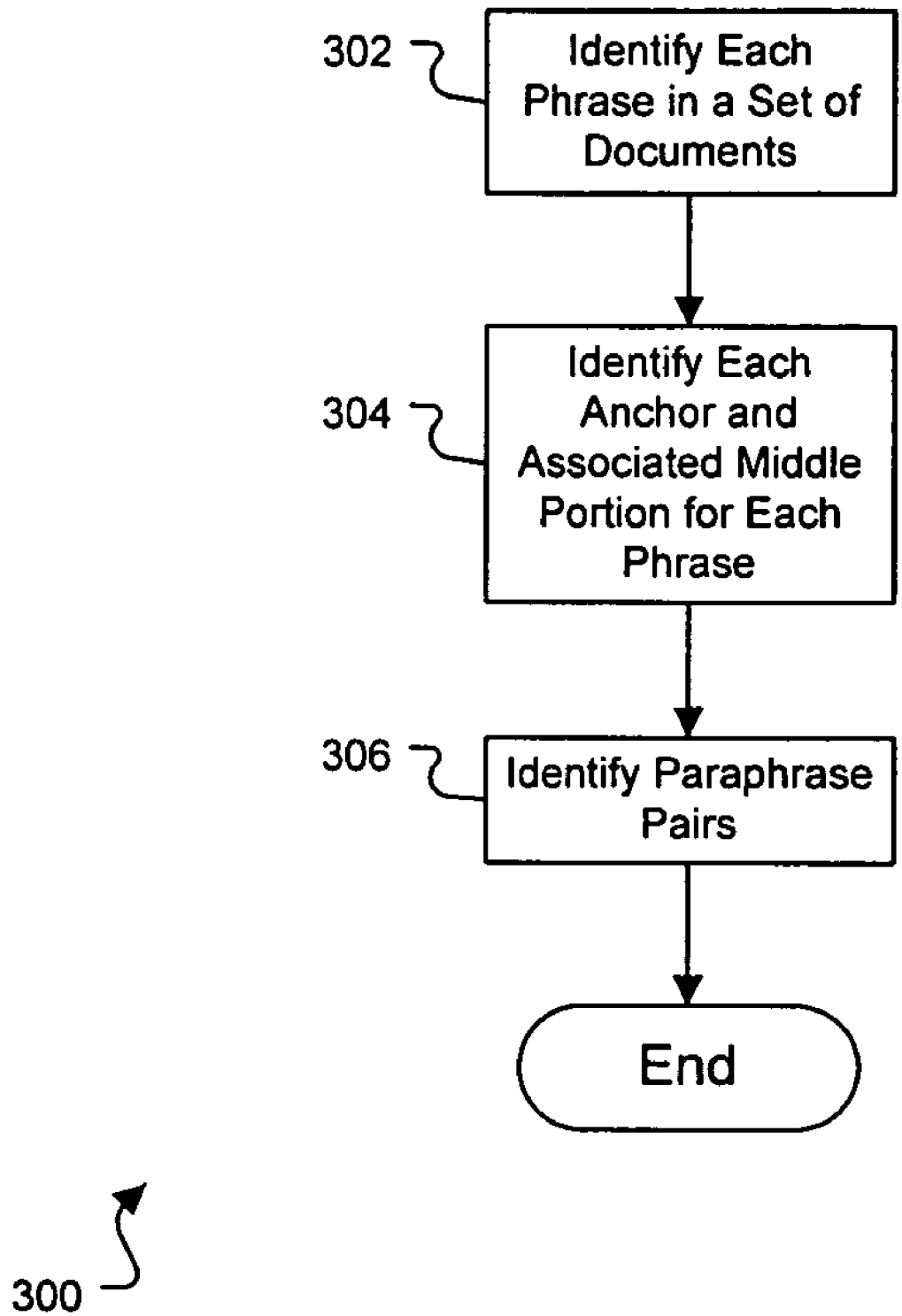
FIG. 3 is a flow chart illustrating operations performed in one implementation of a method for determining whether two or more ngrams contain a paraphrase pair.

FIG. 3 is a flow chart of an alternative process 300 that can be performed to identify potential paraphrase pairs. First, each ngram within a textual input is identified (step 302). Each identified ngram is stored in a first map (dictionary), where the keys are the identified ngrams and the value associated with the key is the number of times that the ngram appears within the textual input. The first map will contain as many keys are there are identified ngrams; duplicate ngrams are not stored in the first map. In one implementation, the first map can be created and stored on a single computer. In an alternative implementation, the first map can be created and stored across a distributed architecture of multiple computers. In this implementation, the process of creating and storing the first map is divided between multiple computers to reduce the amount of time required to create the first map. In another implementation, the process of creating and storing of the first map is divided among multiple computers using the MapReduce programming model. A description of the MapReduce programming model can be found in commonly owned U.S. patent application Ser. No. 11/204,922, filed Aug. 15, 2005, entitled "Scalable user clustering based on set similarity," the entire disclosure of which regarding this programming model is incorporated by reference. The MapReduce programming model allows the tasks involved with the creation of the first map to be efficiently and effectively split across multiple computers.

The MapReduce process that creates the first map takes advantages of sentences from Web documents. Given the very large number of such sentences, the process benefits from the MapReduce model in that it transparently distributes the work across several computers. The input is a large set of Web documents. The Map phase splits the input into smaller subsets of documents that can be processed independently; these smaller subsets of documents can be allocated to different computers for faster processing. Within a Map task, the documents are processed sequentially by splitting them into sentences, and then identifying and issuing the corresponding ngrams from each sentence:

For each sentence, each ngram is issued from the Map phase to the Reduce phase as a pair of a key and a value, also referred to as a (key, value) pair. The key is the ngram itself. The value is the number of times the ngram has been identified in the sentence; the value is usually 1, but it is possible for the value to be greater than 1 for particular sentences. After the Map phase is completed, all of the (key, value) pairs that were issued are redistributed among the available computers; MapReduce ensures that all pairs with the same key issued from Map to Reduce will be distributed to the same task of the Reduce phase. In the Reduce phase, each group of (key, value) pairs from the Map phase that have the same key are identified, the corresponding values are summed, and a single (key, value) pair for the group of (key, value) pairs that have the same key is issued, where the (key, value) pair has the same key as the key of each of the (key, value) pairs, and the value is the summed values of the (key, value) pairs. These (key, value) pairs, in addition to each (key, value) pair that has a unique key, are the final output from the MapReduce. The value for any given key (ngram) is the number of times the key appears in the textual input. The first map of ngrams is stored across multiple computers, such that any given key (ngram) occurs only once within the entire map. In one implementation, only (key, value) pairs that have a value greater than a certain threshold value are issued as the final output from the MapReduce.

Using the ngrams stored in the first map, each anchor is identified for each ngram along with the middle portion associated with each anchor (step 304). A second map is created using the identified anchors, with the keys of the second map being each anchor, e.g., the concatenation of the beginning constant portion and the ending constant portion, and the values associated with the keys are the one or more middle portions found in the ngrams in between the beginning constant portion and ending constant portion of the anchor. When creating the second map, the input is the set of all (key, value) pairs from the first map. In each (key, value) pair, the key is the ngram and the value is the associated frequency count. The Map phase splits the input into smaller subsets of (key, value) pairs. Within a Map task, each subset of (key, value) pairs is processed sequentially. For each key, the ngram is split into its component words. The sequence of words is artificially divided into all possible combinations of a beginning constant portion, an ending constant portion, and the remaining middle portion. For each combination, the beginning constant portion is concatenated with the ending constant portion to form a new key. The new key is the anchor of the ngram. The new value is the remaining middle portion. The new (key, value) pair, consisting of the new key and the new value, is passed on to the Reduce phase. After the Map phase is completed, all of the (key, value) pairs that were issued are redistributed among the available computers; MapReduce ensures that all pairs with the same key issued from Map to Reduce will be distributed to the same task of the Reduce phase. The Reduce phase scans each group of (key, value) pairs from the Map phase that have the same key. The Reduce phase combines all the values (i.e., the various middle portions extracted for this key) into a new, concatenated value, and the Reduce phase issues the resulting (key, value) pair of the key and the concatenated value as output. Such (key, value) pairs are the final output from the MapReduce. In one implementation, the second map can be created and stored on a single computer. In an alternative implementation, the second map can be created and stored across a distributed architecture of multiple computers. In this implementation, the process of creating and storing the second map is divided between multiple computers to reduce the amount of time required to create the second map. In one implementation, the process of creating and storing of the second map is divided among multiple computers using the MapReduce programming model. The MapReduce programming model allows the tasks involved with the creation of the second map to be efficiently and effectively split across multiple computers. Each unique anchor will only have one key in the mapping; if more than one middle portion is associated with a unique anchor, all of the associated middle portions are stored as values for the key.

The middle portions stored in the second map are used to identify potential paraphrase pairs (step 306). A third map is created using the identified potential paraphrase pairs, with the keys of this third map being each potential paraphrase pair, and the values associated with the keys are the anchors associated with the potential paraphrase pair. During the Map phase, each value in the second map is split into a set of phrases, and all combinations of two phrases arranged in lexicographic order become keys of the third map. For example, if the second map contained two entries, the first entry having a key of anchor1 and a value of {phrase1, phrase2, phrase3}, the phrases being in lexical order, and the second entry having a key of anchor2 and a value of {phrase1, phrase3, phrase4} the phrases being in lexical order, six possible potential paraphrase pair combinations are generated: (phrase1,phrase2), (phrase1,phrase3), and (phrase2, phrase3), all of which are associated with anchor1; and (phrase1,phrase3), (phrase1,phrase4), and (phrase3, phrase4), all of which are associated with anchor2.

During the Reduce phase, each of these unique potential paraphrase pairs becomes a key of the third map, with the value for each unique potential paraphrase pair being the anchor or anchors associated with each potential paraphrase pair. Continuing the example above, the following five keys and values are stored in the third map: the key (phrase1, phrase2) with the value {anchor1}, the key (phrase1,phrase3) with the value {anchor1,anchor2}, the key (phrase1,phrase4)

with the value {anchor2}, the key (phrase2,phrase3) with the value {anchor1}, and the key (phrase3,phrase4) with the value {anchor2}.

Each of the two elements of the potential paraphrase pair will be referred to as a paraphrase member of the potential paraphrase pair. Each anchor key in the second map that only has one associated middle portion value is ignored, as that middle portion has no potential corresponding member. Once the third map is created, the number of anchors in each value of the third map is also the number of times the potential paraphrase pair key associated with the value occurs in the second map. Therefore, using the third map, it is easy to identify the potential paraphrase pairs that occur in the most distinct contexts within the textual input.

Ordering of the paraphrase members within the potential paraphrase pair is unimportant; the potential paraphrase pairs "ripped/torn" and "torn/ripped" are equivalent, and this potential paraphrase pair will only appear in the third map once. This third map can be stored for later use and analysis, e.g., identifying potential paraphrase pairs that occur with greater frequency. In one implementation, the third map can be created and stored on a single computer, without using the MapReduce programming model as described above.

Embodiments of the invention and all of the functional operations described in this specification can be implemented in digital electronic circuitry, or in computer software, firmware, or hardware, including the structural means disclosed in this specification and structural equivalents thereof, or in combinations of them. Embodiments of the invention can be implemented as one or more computer program products, i.e., one or more computer programs tangibly embodied in an information carrier, e.g., in a machine-readable storage device or in a machine-readable propagated electromagnetic signal, for execution by, or to control the operation of, data processing apparatus, e.g., a programmable processor, a computer, or multiple processors or computers. A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Particular embodiments of the invention have been described. Other embodiments are within the scope of the following claims. For example, actions recited in the method claims can be performed in different orders and still achieve desirable results. In addition, actions can be performed in parallel. For example, ngrams can be compared while sentences are still being identified.

What is claimed is:

1. A method comprising:
receiving textual input in data processing apparatus;
identifying, by operation of the data processing apparatus, a plurality of ngrams, each ngram being a sequence of words within the textual input;
dividing, by operation of the data processing apparatus, each identified ngram into three portions: a beginning constant portion containing a first number of words at the beginning of the ngram, an ending constant portion containing a second number of words at the end of the ngram, and a middle portion containing the words of the ngram between the beginning constant portion and the ending constant portion;
determining, by operation of the data processing apparatus, an anchor for each ngram, the anchor comprising the beginning constant portion and the ending constant portion of the ngram; and
identifying, by operation of the data processing apparatus, a plurality of potential paraphrase pairs, wherein if the anchor of a first ngram is the same as the anchor of a second ngram in the plurality of ngrams, the middle portion of the first ngram and the middle portion of the second ngram is identified as being a potential paraphrase pair, wherein the middle portion of the first ngram is textually different from the middle portion of the second ngram.

2. The method of claim 1, wherein determining the anchor comprises including a named entity as part of the anchor.

3. The method of claim 2, wherein the anchor further comprises a remainder of an adverbial relative clause modifying the named entity.

4. The method of claim 3, further comprising:
counting the number of unique anchors associated with each identified potential paraphrase pair to determine the quality of each potential paraphrase pair; and
identifying potential paraphrase pairs that are associated with a larger number of anchors as being of higher quality than potential paraphrase pairs that are associated with a smaller number of anchors.

5. The method of claim 2, further comprising:
counting the number of unique anchors associated with each identified potential paraphrase pair to determine the quality of each potential paraphrase pair; and identifying potential paraphrase pairs that are associated with a larger number of anchors as being of higher quality than potential paraphrase pairs that are associated with a smaller number of anchors.

6. The method of claim 1, further comprising:
counting the number of unique anchors associated with each identified potential paraphrase pair to determine the quality of each potential paraphrase pair; and
identifying potential paraphrase pairs that are associated with a larger number of anchors as being of higher quality than potential paraphrase pairs that are associated with a smaller number of anchors.

7. The method of claim 6, further comprising:
identifying each potential paraphrase pair as being a higher quality paraphrase pair if the number of unique anchors associated with the potential paraphrase pair is equal to or greater than a threshold value.

8. The method of claim 7, further comprising:
receiving a term, the term being a sequence of one or more words;
identifying one or more higher quality paraphrase pairs in each of which the term is identical to a paraphrase member; and
adding the non-identical paraphrase member of each identified higher quality paraphrase pair to a set of suggested alternatives for the term.

9. The method of claim 1, wherein each ngram has between seven and ten words.

10. The method of claim 1, wherein the first number of words is three words, and the second number of words is three words.

11. The method of claim 1, further comprising:
identifying one or more sentences in the textual input, wherein each identified ngram is a sequence of one or more words within an identified sentence.

12. A computer program product, encoded on a computer readable medium, operable to cause data processing apparatus to perform operations comprising:
receiving textual input;
identifying a plurality of ngrams, each ngram being a sequence of words within the textual input;
dividing each identified ngram into three portions: a beginning constant portion containing a first number of words at the beginning of the ngram, an ending constant portion containing a second number of words at the end of the ngram, and a middle portion containing the words of the ngram between the beginning constant portion and the ending constant portion;
determining an anchor for each ngram, the anchor comprising the beginning constant portion and the ending constant portion of the ngram; and
identifying a plurality of potential paraphrase pairs, wherein if the anchor of a first ngram is the same as the anchor of a second ngram in the plurality of ngrams, the middle portion of the first ngram and the middle portion of the second ngram is identified as being a potential paraphrase pair, wherein the middle portion of the first ngram is textually different from the middle portion of the second ngram.

13. A system comprising:
one or more computers;
where the one or more computers are configured to perform operations comprising:
receiving textual input;
identifying a plurality of ngrams, each ngram being a sequence of words within the textual input;
dividing each identified ngram into three portions: a beginning constant portion containing a first number of words at the beginning of the ngram, an ending constant portion containing a second number of words at the end of the ngram, and a middle portion containing the words of the ngram between the beginning constant portion and the ending constant portion;
determining an anchor for each ngram, the anchor comprising the beginning constant portion and the ending constant portion of the ngram;
identifying a plurality of potential paraphrase pairs, wherein if the anchor of a first ngram is the same as the anchor of a second ngram in the plurality of ngrams, the middle portion of the first ngram and the middle portion of the second ngram is identified as being a potential paraphrase pair, wherein the middle portion of the first ngram is textually different from the middle portion of the second ngram;
receiving a query entered as an input in a search engine by a user;
identifying one or more suggestions, each suggestion being an alternative term for replacing a sequence of one or more words in the query, where the sequence is one paraphrase member of a potential paraphrase pair and the suggestion is the other paraphrase member of the potential paraphrase pair; and
generating one or more alternative queries using the one or more suggestions.

14. The system of claim 13, wherein the operations further comprise:
counting the number of times each identified potential paraphrase pair occurs in a set of documents; and
determining rankings for the identified potential paraphrase pairs according to the number of times each identified potential paraphrase pair occurs in the set of documents.

15. The system of claim 13, wherein determining the anchor comprises including a named entity as part of the anchor.

16. The system of claim 15, wherein the anchor further comprises a remainder of an adverbial relative clause modifying the named entity.

17. The system of claim 16, the operations further comprising:
counting the number of unique anchors associated with each identified potential paraphrase pair to determine the quality of each potential paraphrase pair; and
identifying potential paraphrase pairs that are associated with a larger number of anchors as being of higher quality than potential paraphrase pairs that are associated with a smaller number of anchors.

18. The system of claim 15, the operations further comprising:
counting the number of unique anchors associated with each identified potential paraphrase pair to determine the quality of each potential paraphrase pair; and
identifying potential paraphrase pairs that are associated with a larger number of anchors as being of higher quality than potential paraphrase pairs that are associated with a smaller number of anchors.

19. The system of claim 13, the operations further comprising:
identifying one or more sentences in the textual input, wherein each identified ngram is a sequence of one or more words within an identified sentence.

20. The system of claim 13, the operations further comprising:

counting the number of unique anchors associated with each identified potential paraphrase pair to determine the quality of each potential paraphrase pair; and identifying potential paraphrase pairs that are associated with a larger number of anchors as being of higher quality than potential paraphrase pairs that are associated with a smaller number of anchors.

21. The system of claim 20, the operations further comprising:

identifying each potential paraphrase pair as being a higher quality paraphrase pair if the number of unique anchors associated with the potential paraphrase pair is equal to or greater that a threshold value.

22. The system of claim 21, the operations further comprising:

receiving a term, the term being a sequence of one or more words;

identifying one or more higher quality paraphrase pairs in each of which the term is identical to a paraphrase member; and adding the non-identical paraphrase member of each identified higher quality paraphrase pair to a set of suggested alternatives for the term.

23. The system of claim 13, wherein each ngram has between seven and ten words.

24. The system of claim 13, wherein the first number of words is three words, and the second number of words is three words.

* * * * *

UNITED STATES PATENT AND TRADEMARK OFFICE
CERTIFICATE OF CORRECTION

| | | |
|---|---|---|
| PATENT NO. | : 7,937,265 B1 | |
| APPLICATION NO. | : 11/238623 | |
| DATED | : May 3, 2011 | |
| INVENTOR(S) | : Alexandru Marius Pasca and Peter Szabolcs Dienes | |

It is certified that error appears in the above-identified patent and that said Letters Patent is hereby corrected as shown below:

Column 13, Line 13 at Claim 21; replace:

"or greater that a threshold value." with
-- or greater than a threshold value. --

Signed and Sealed this
Ninth Day of August, 2011

David J. Kappos
*Director of the United States Patent and Trademark Office*